US008881110B2

(12) United States Patent
Schwartz et al.

(10) Patent No.: US 8,881,110 B2
(45) Date of Patent: Nov. 4, 2014

(54) ROLE-BASED AUTOMATION SCRIPTS

(75) Inventors: Dror Schwartz, Holon (IL); Moshe Eran Kraus, Mazkeret Batya (IL); Amir Kessner, Ramat-Gan (IL); Sagi Monza, Rishon-Lezion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 487 days.

(21) Appl. No.: 13/047,209

(22) Filed: Mar. 14, 2011

(65) Prior Publication Data

US 2011/0307893 A1 Dec. 15, 2011

Related U.S. Application Data

(63) Continuation-in-part of application No. 12/814,345, filed on Jun. 11, 2010.

(51) Int. Cl.
*G06F 9/44* (2006.01)
*G06F 11/36* (2006.01)

(52) U.S. Cl.
CPC .................... *G06F 11/3688* (2013.01)
USPC ............ 717/125; 717/115; 717/124; 717/127

(58) Field of Classification Search
CPC ............ G06F 9/45512; G06F 11/3688; G06F 11/3664; G06F 11/3466
See application file for complete search history.

(56) References Cited

U.S. PATENT DOCUMENTS

| | | | |
|---|---|---|---|
| 6,549,216 B1 | 4/2003 | Schumacher et al. | |
| 7,716,322 B2 | 5/2010 | Benedikt et al. | |
| 7,757,175 B2 | 7/2010 | Miller | |
| 8,370,811 B2 | 2/2013 | Grechanik et al. | |
| 8,543,982 B2* | 9/2013 | Zeanah et al. | 717/125 |
| 8,549,480 B2 | 10/2013 | Cohen et al. | |
| 8,572,568 B2 | 10/2013 | Giat | |
| 8,589,883 B2* | 11/2013 | Demant et al. | 717/124 |
| 8,677,324 B2 | 3/2014 | Markuza et al. | |
| 2005/0132232 A1 | 6/2005 | Sima | |
| 2008/0216056 A1* | 9/2008 | Bate et al. | 717/127 |
| 2009/0089747 A1* | 4/2009 | Namjoshi et al. | 717/115 |
| 2009/0225037 A1 | 9/2009 | Williamson et al. | |
| 2010/0083190 A1* | 4/2010 | Roberts et al. | 715/863 |
| 2010/0095161 A1 | 4/2010 | Giat | |
| 2010/0095208 A1 | 4/2010 | White et al. | |
| 2010/0146488 A1 | 6/2010 | Chen et al. | |
| 2010/0146584 A1 | 6/2010 | Haswarey et al. | |
| 2010/0293014 A1 | 11/2010 | Jain et al. | |
| 2011/0131551 A1 | 6/2011 | Amichai et al. | |

(Continued)

FOREIGN PATENT DOCUMENTS

| | | |
|---|---|---|
| CA | 2679789 A1 | 12/2009 |
| CN | 101135989 A | 3/2008 |
| JP | 2008040537 A | 2/2008 |

OTHER PUBLICATIONS

Rodrigues et al., Using a script model to preserve the consistency within an UI design environment, Sep. 2005, 7 pages.*

(Continued)

*Primary Examiner* — Thuy Dao

(57) ABSTRACT

A computer performs an action called for by a script. The computer determines how to perform the action based in part on a role template not included in the script and based in part on a role-template extension included in the script.

15 Claims, 4 Drawing Sheets

(56) References Cited

U.S. PATENT DOCUMENTS

| | | | |
|---|---|---|---|
| 2012/0023484 A1* | 1/2012 | Demant et al. | 717/125 |
| 2012/0185823 A1 | 7/2012 | Monza et al. | |
| 2013/0074043 A1* | 3/2013 | Fu | 717/125 |
| 2013/0097586 A1 | 4/2013 | Chandra et al. | |

OTHER PUBLICATIONS

Jiang et al., Study on real-time test script in automated test equipment, 2009, 5 pages.*

"Ranorex:User Guide", 2011, Ranorex GmbH, Graz, Austria.
"Replay Xcessory User's Guide" (Version 3), 2005, Integrated Computer Solutions, Inc., Beford, MA.
"Replay Xcessory User's Guide" (Version 4), 2010, Integrated Computer Solutions, Inc., Beford, MA.
Daniel et al., Automated GUI refactoring and test script repair, Jul. 2011, 4 page.
Grechanik et al., Maintaining and evolving GUI-directed test scripts, May 2009, 11 pages.
Nivas, T., Test harness and script design principles for automated testing of non-GUI or web based applications, Jul. 2011, 8 pages.
Yip et al., Privacy-preserving browser-side scripting with BFlow, Apr. 2009, 14 pages.

* cited by examiner

PARENT HELPER WEBSITE 300

CHILD DEVELOPMENT TRACKING FORM 302

NAME — 316, 304, 314

BABY DOE

DATE — 320

2011-May-09

306

| 2011 ← MAY → | | | | | | |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

326

HEIGHT — 322

1' 4"

WEIGHT — 324

14 lbs, 10 oz

310

308

ENTER — 312

FIG. 3

ROLE-BASED AUTOMATION SCRIPTS

RELATED APPLICATIONS

This is a continuation-in-part of copending U.S. patent application Ser. No. 12/814,345 filed 2010 Jun. 22.

BACKGROUND

Web applications can be tested using automated clients that simulate user actions. For example, a user's inputs to a web application can be recorded and then represented in an automation script which can be played back, e.g., repeatedly and from different client machines, to test a web site's performance.

BRIEF DESCRIPTION OF THE DRAWINGS

The following figures represent examples or implementations of the invention and not the invention itself.

FIG. 3 is a diagram of a website to be tested.

DETAILED DESCRIPTION

An automation system employs: 1) an automation engine based on role templates, and 2) scripts with control-specific role-template extensions. A template extension, in effect, customizes a role-template so that the customized role template corresponds to behavior specific to a given application instance. Relative to automation engines based on the code underlying application controls, an automation engine based on role templates represents a considerable reduction in complexity and in the frequency with which the engine is to be updated if response to changes in the underlying code. The use of scripts with role-template extensions compensates for any loss of specificity due to the use of role templates instead of the underlying code.

Figure 1:
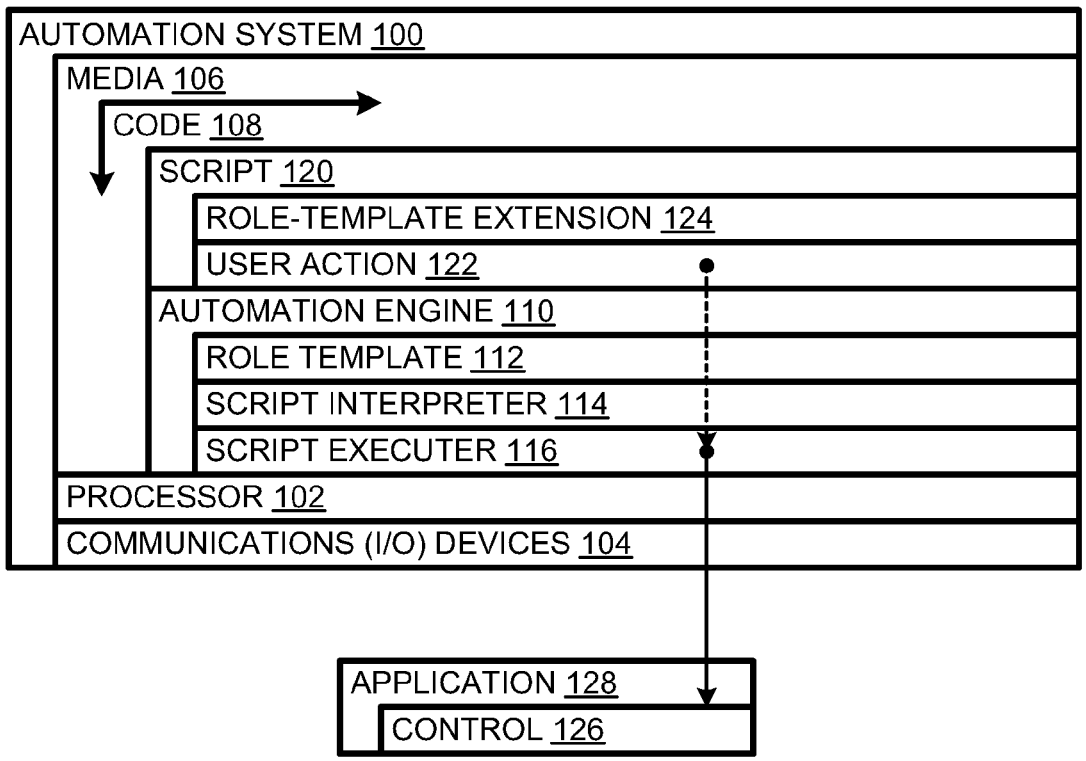
FIG. 1 is a schematic diagram of an automation system in accordance with an example.

An automation system 100, shown in FIG. 1, includes a computer with a processor 102, communications (including input/output) devices 104, and computer-readable storage media 106. Media 106 is encoded with code defining the functionality of an automation engine 110, which includes a role template, a script interpreter 114, and a script executer 116. Code 108 also defines a script 120 that specifies a user action 122 and a control-instance-specific role-template extension 124. User action 122 includes an action on a control 126 of an application 128.

Figure 2:
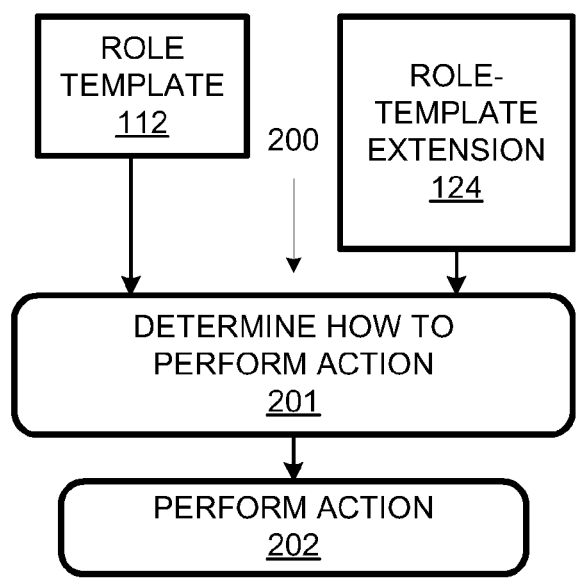
FIG. 2 is a flow chart of a process in accordance with an implementation.

Automation engine 110 is designed to implement a process 200, flow-charted in FIG. 2. At 201, script interpreter 114 determines how to perform action 122 using role template 112 and control-instance-specific extension 124. At 202, script executor 116 executes action 122 on control 126.

Role templates can be used in a procedure known as "duck-typing" to categorize application controls according to their behaviors instead of according to their underlying codings (see parent application Ser. No. 12/814,345). The phrase "duck-typing" is derived from the phrase "If it looks like a duck and acts like a duck, then it is a duck." For example, if the behavior of an application control matches that defined for a slider role template, then the application control is identified as a slider. When a user action script calls for operating a control, the automation engine executing the script can refer to the associated role template to determine how to operate the control.

However, a generic role template may not have sufficient information regarding the behavior of a specific control to achieve a desired level of precision. For example, if a script calls for moving a slider until the value it controls equals some target value, e.g., "83", the slider template may not have the information required to accomplish this. However, the script itself can include control-instance-specific role-template extensions to achieve the desired level of control.

The control-instance-specific role-template extensions can take a variety of forms. For example, they may provide a more complete model of the control instance. For example, the extensions may allow an automation engine to "predict" the position to which the slider must be moved to reach the target value. Alternatively, the extension may specify a procedure for obtaining actual values produced while the slider is moved so that the movement can stop when the target value is reached.

A template extension, in effect, customizes a role-template so that the resulting customized template applies specifically to the application instance from which the template extension was generated. By incorporating control-instance-specific role-template extensions in the scripts instead of in the automation engine itself, high-precision simulations of user actions can be achieved without burdening an automation engine with the wide variety of coding that can characterize similarly functioning web application controls. As a result, the automation engine itself is simpler to build, simpler to maintain, and less prone to code conflicts.

While the inclusion of role-template extensions increases script complexity, the net result is a decrease in overall complexity. At any given time, the combination of an automation engine and a script being executed is not burdened by code for controls other than those targeted by the script; to the contrary, an automation engine based on underlying code must support controls that are not targeted by a currently executing script but that might be targeted by another script. Also, role templates plus extensions tend to represent those aspects of a targeted control that are relevant to the automation process more efficiently than they are represented by their underlying code. Finally, to the extent that differences in controls are represented separately in scripts rather than together in an automation engine, the likelihood of code collisions is reduced.

A possible website 300 is presented for expository purposes in FIG. 3 having a document 302 including several widgets, e.g., a drop-down list widget 304, a date-selection calendar widget 306, slider widgets 308 and 310, and a button widget 312. Drop-down list widget 304 may be used to select a child's name from a drop-down list that appears when button 314 is activated. The selected name appears in text box 316. Calendar widget 306 is used to control a date presented in a date field 320. "Height" slider 308 controls a height value (in this case expressed in feet and inches) in a field 322. "Weight" slider 310 is used to control a weight value (in this case expressed in pounds and ounces) in a field 324. Enter button 312, when activated, causes the displayed information to be entered into a child development database.

Figure 4:
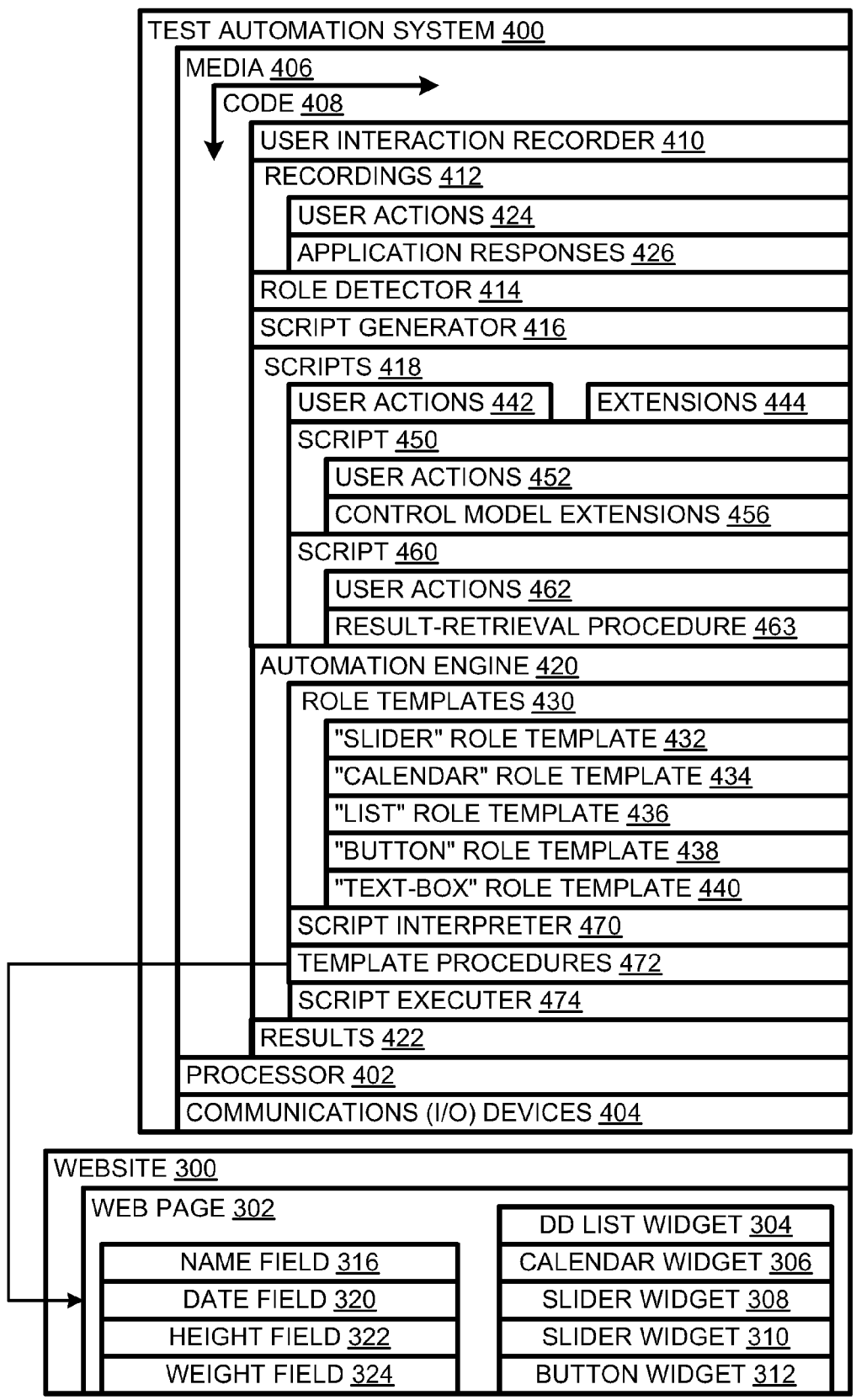
FIG. 4 is a schematic diagram of an automation system used to test the website of FIG. 3.

Test automation system 400, FIG. 4, is designed to monitor, test, and evaluate websites such as website 300 under various load conditions. System 400 includes a processor 402, communications (including input/output) devices 404, and computer-readable storage media 406. Media 406 is encoded with code 408 defining a user-interaction recorder 410, recordings 412, a role detector 414, a script generator 416, scripts 418, an automation engine 420, and results 422.

User interaction recorder 410 records a user's interaction with a website, e.g., website 300, to produce recordings that represent not only user actions 424 but also application responses 426 to those actions. For example, recordings 412 can represent not only a user's movement of a handle 326 (FIG. 3) of slider widget 308, but also, the effect of that movement on the value in height field 322.

Role detector 414 analyzes recordings 412 to detect widget-based and other controls, e.g., widgets 304-312, and categorizes them according to the roles they serve. Each role corresponds to a role template 430 of automation engine 420. For example, role detector 414 can match slider widgets 308 and 310 with a slider role template 432, which encompasses controls that move either vertically or horizontally and can cause a value in a nearby field to vary with the amount of movement. For another example, calendar widget 306 can be matched with calendar role template 434 as it is a 7-column array of consecutive numbers that cause a date to be displayed in a nearby field when one of the array cells is activated. Similarly, role detector 414 can match drop-down list widget 304 with list role template 436, and button widget 312 with button role template 438. Note that one control can be matched with more than one role; for example, drop-down list widget 304 can be matched not only with list role template 436, but also with text box role template 440.

Script generator 416 generates scripts 418 from recordings 412. The recordings used to generate scripts can be the same as those used for identifying roles or they can be recordings specially made for script generation. Scripts can specify a single action, e.g., "move slider 308 up 32 pixels", but are more commonly multi-action, e.g., "select a predetermined name using list widget 404, adjust slider 308 to select a predetermined height, adjust slider 310 to select a predetermined weight, and activate button 312".

In addition to specifying user actions 442, scripts 418 include role-template extensions 444. For example, for any control to be acted upon by a script, the corresponding role or role template 430 can be identified in the script. Information generic to controls having the same role can be included in the role template but omitted from the script, but information that distinguishes a particular control from others encompassed by a role template is included in the role-template extension and omitted from the role template itself. The role-template extensions included in a script can depend on the way an action is expressed. For example, if the action is "move handle 326 of slider widget 308 up 17 pixels", then this action may be handled using only information associated with slider template 432. However, if the action is to "move handle 326 until the value in field 322 equals 2'3", then control-instance-specific information from a role-template extension is used.

Script 450, for example, specifies user actions 452 and includes a role-template extension in the form of a control-model extension 456. For example, control-model extensions 456 can specify a coefficient indicating how many pixels handle 326 must be moved for the value in field 322 to change by one unit. Also, since inches are used as units, extensions 456 can specify that the inch value changes modulo 12 (rather than modulo 10 as it would for centimeters). Such information serves as virtual template extensions in that it extends the model defined by a role template to apply more specifically to a particular control instance.

Script 460 specifies user actions 462 and includes a role-template extension in the form of a result-retrieval procedure 463. Procedure 463 specifies how to retrieve a value from field 322; the value can be repeatedly retrieved while handle 326 is moved until a desired value is reached. In other words, script 460 operates closed-loop based on actual values, while script 450 operates open-loop using predictions based on a model.

Once a script has been generated, it can be used to test a website. Test automation system 400 can include any number of geographically distributed computers, each of which can run respective copies of a script to simulate users from around the world accessing the site asynchronously and in parallel. To this end, a script interpreter 470 of automation engine 420 interprets the script, identifies the actions to be taken, and their target controls. Interpreter identifies the associated role templates and modifies template procedures 472 in accordance with the role-template extensions included in the script. Script executer 474 of automation engine 420 then executes the modified procedures.

Figure 5:
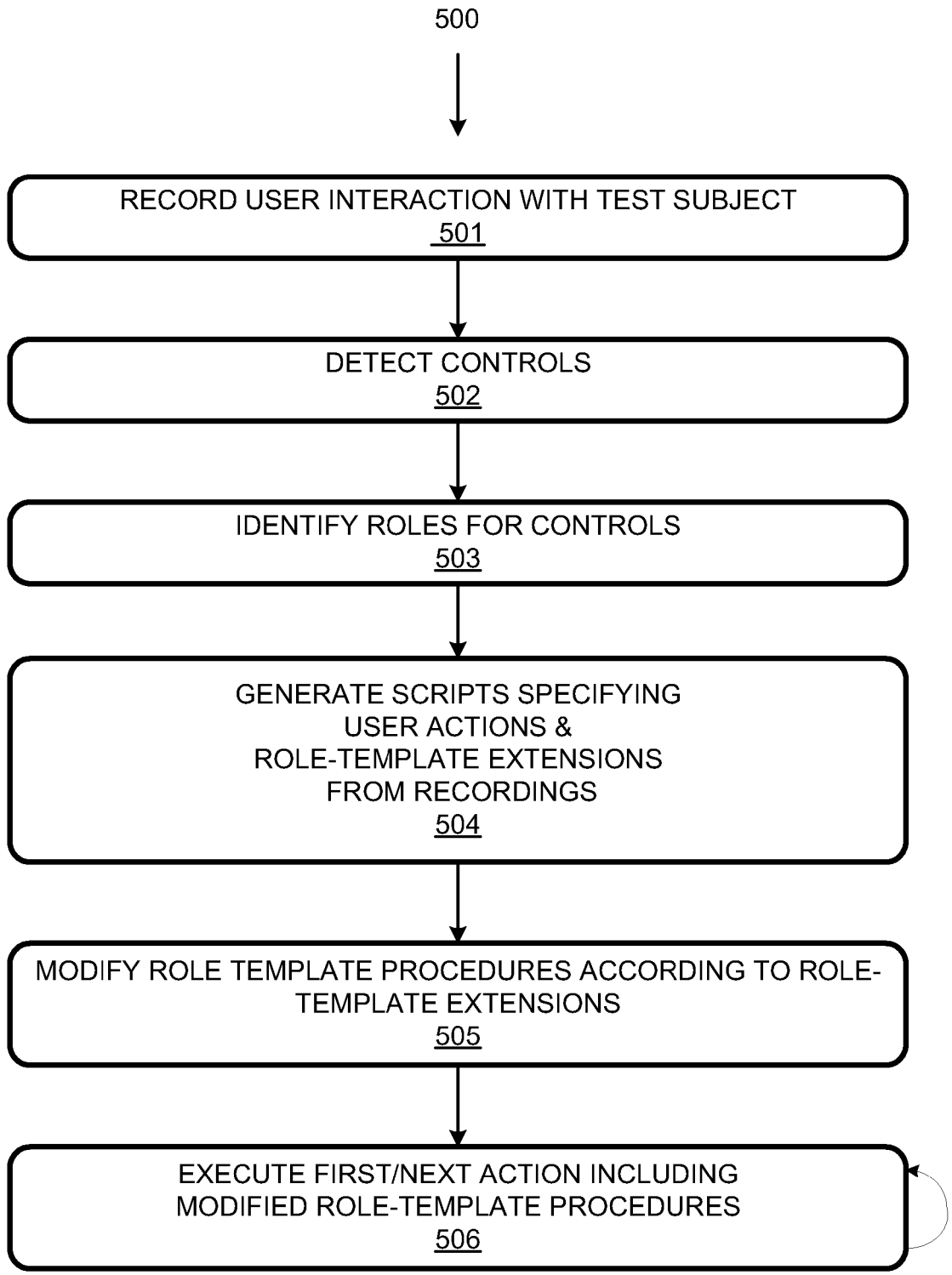
FIG. 5 is a flow chart of a process implemented by the automation system of FIG. 4 to test the website of FIG. 3.

Test automation system 400 implements a process 500, flow charted in FIG. 5. At 501, user interactions with a test subject, e.g., web site, document, application, or widget, are recorded. At 502, controls are detected in the test subject. At 503, roles are identified for the controls. At 504, scripts are generated from user interaction recordings; the scripts specify user actions and include control-instance-specific role-template extensions. At 505, procedures associated with role templates are modified according to role-template extensions to determine how to perform the user actions. At 506, an action is executed in the form of the customized role procedures. Process segment 506 is iterated until all actions in the current script have been executed.

While web applications are emphasized above, role-template extensions can be used in other contexts, including non-web and non-IP (Internet Protocol) networks. The user-action recordings can be directly converted to scripts; alternatively, some editing may be permitted.

Herein, a "script" is a sequence of instructions intended to be interpreted and used to control an application. Herein, an "application control" is a user interface element that can be manipulated by a user and that when so manipulated causes some change, e.g., in a nearby value. Herein, a "role" is a behaviorally defined category. The roles referred to herein categorize application controls according to their behaviors rather than according to their underlying codes. Herein, a "template" is a pattern that can be filled in or extended in a variety of ways, e.g., using instance-specific information in the form of template extensions. The templates referred to herein are role templates used to categorize controls according to the roles they serve. The templates herein are associated with procedures for controlling controls conforming to respective templates.

Herein, "including" does not preclude "constituting". For example, a system can include itself as well as subsystems. Herein, nestable terms include system, process, script, and action. For example, a system can include systems, e.g., subsystems, a process can include processes, an action can include actions, and a script can include scripts.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer to a system including non-transitory tangible material in or on which information is or can be encoded so as to be readable by a computer. "Display medium" and "display media" refer to storage media in which information is encoded in human readable form. "Computer-readable" refers to storage media in which information is encoded in computer-readable form.

Herein, "machine", "device", and "computer" refer to hardware or a combination of hardware and software. A "virtual" machine, device or computer is a software analog or representation of a machine, device, or computer, respectively, and not a "real" machine, device, or computer. A "server" is a real (hardware or combination of hardware and software) or virtual computer that provides services to computers. Herein, unless otherwise apparent from context, a functionally defined component (e.g., an interpreter, an executer, recorder, detector, or generator) of a computer is a combination of hardware and software executing on that hardware to provide the defined functionality. However, in the context of code encoded on computer-readable storage media, a functionally-defined component can refer to software.

Herein, a computer is a machine having co-located or distributed components including computer-readable storage media, a processor, and one or more communications devices. The media stores or is configured to store code representing data including computer-executable instructions. The processor, which can include one or more central-processing units (CPUs), reads and manipulates data in accordance with the instructions. Herein, "processor" refers to a hardware component. "Communication(s) device(s)" refers to computer-hosted devices used to transmit and/or receive data. Herein, a "computer network" is a network of communicatively coupled real and, in some cases, virtual nodes, wherein the nodes can be, by way of example and not of limitation, servers, network infrastructure devices, and peripherals. Herein, a "node" encompasses real and virtual devices.

In this specification, related art is discussed for expository purposes. Related art labeled "prior art", if any, is admitted prior art. Related art not labeled "prior art" is not admitted prior art. In the claims, "said" qualifies elements for which there is explicit antecedent basis in the claims; "the" refers to elements for which there is implicit antecedent basis in the claims; for example, the phrase "the center of said circle" indicates that the claims provide explicit antecedent basis for "circle", which also provides implicit antecedent basis for "center" since every circle contains exactly one center. The illustrated and other described examples and implementations, as well as modifications thereto and variations thereupon are within the scope of the following claims.

What is claimed is:

1. A computer-implemented process comprising:
   interpreting a script that specifies an action to be taken on an application control and that includes a role-template extension, said interpreting including identifying said action, said application control, and a role template to which said action conforms, said role template including a role procedure, said role template being external to said script, said interpreting including determining how to perform an action on an application control from information obtained
      in part from said role template that is external to said script, and
      in part from said role-template extension included in said script;
   modifying said role procedure in accordance with the role-template extension so as to yield a modified procedure; and
   performing said action on said control at least in part by executing said modified procedure.

2. A process as recited in claim 1 further comprising:
   recording a user's interaction with an application including said control so as to provide a recording of a user-initiated instance of said action and a response by said application to said user-initiated instance of said action; and
   generating said script from said recording so that said role-template extension is obtained at least in part from said recording.

3. A process as recited in claim 1 wherein said application is or includes a web widget embedded in a web document.

4. A process as recited in claim 1 wherein said interpreting includes:
   determining an actual result of said action; or
   predicting a result of said action.

5. A process as recited in claim 1 wherein said role template specifies behaviors common to plural controls including said control and other controls, said role-template extension specifying behaviors or aspects of behavior that differentiate said control from said other controls.

6. A system comprising a processor and non-transitory media encoded with code that, when executed by said processor, defines:
   a role template specifying behaviors to which controls conform, said role template including a role procedure;
   a script interpreter for interpreting a script specifying a user action on an application control and including a role-template extension for said control, said role template being external to said script, said interpreting including modifying said role procedure in accordance with said role-template extension to yield a modified procedure; and
   a script executer for executing said script so as to perform said action on said control based at least in part by executing said modified procedure.

7. A system as recited in claim 6 further comprising:
   a recorder for recording a user's interaction with an application including said control so as to produce a recording of a user action and said application's response to said user action; and
   a script generator for generating said script so that said role-template extension is determined at least in part from said response.

8. A system as recited in claim 6 wherein said control is included in a web widget.

9. A system as recited in claim 6 wherein said role-template extension extends said role template to configure said automation engine to:
   determine an actual result of said action; or
   predict a result of said action.

10. A system as recited in claim 6 wherein said role template defines behaviors common to plural controls including said control and other controls, said role-template extension specifying instance-specific behaviors differentiating said control from said other controls corresponding to said role template.

11. A system comprising non-transitory storage media encoded with code configured to, when executed by a processor, cause the processor to act on an application control by executing a script specifying an action to be performed on said control, said script including a role-template extension to a role template not included in said script, said code determining how to perform said act based at least in part on said role template and based at least in part on said role-template extension, wherein said role template includes a role procedure, said code being further configured to, prior to said executing said script, interpret said script so as to identify said action and said application control, identify said role template based on said action, modify said role procedure in accordance with said role-template extension to yield a modified procedure, said executing a script including executing said modified procedure.

12. A system as recited in claim 11 further comprising said processor.

13. A system as recited in claim 11 wherein said code defines another role template that specifies behaviors to which said control does not conform.

14. A system as recited in claim 11 wherein said control is provided by a web widget.

15. A system as recited in claim 11 wherein said code defines said script, said role-template defining behaviors common to plural controls including said control and other controls, said role-template extension specifying instance-specific behaviors differentiating said control from said other controls.

\* \* \* \* \*